United States Patent [19]
Inoue et al.

[11] Patent Number: 4,986,241
[45] Date of Patent: Jan. 22, 1991

[54] INTERNAL COMBUSTION ENGINE AIR-FUEL RATIO CONTROL SYSTEM INCLUDING ALCOHOL SENSOR BACK-UP CONTROL ARRANGEMENT

[75] Inventors: Ryuzaburo Inoue, Yamato; Tadaki Oota, Fujisawa, both of Japan

[73] Assignee: Nissan Motor Company, Ltd., Japan

[21] Appl. No.: 483,029

[22] Filed: Feb. 21, 1990

[30] Foreign Application Priority Data

Feb. 23, 1989 [JP] Japan .................................. 1-43587
Mar. 29, 1989 [JP] Japan .................................. 1-79372
Mar. 29, 1989 [JP] Japan .................................. 1-79373

[51] Int. Cl.$^5$ ............................................ F02D 41/14
[52] U.S. Cl. .................................. 123/479; 123/1 A; 123/489
[58] Field of Search ............... 123/1 A, 440, 479, 489, 123/494

[56] References Cited

U.S. PATENT DOCUMENTS

| | | | |
|---|---|---|---|
| 4,391,253 | 7/1983 | Ito | 123/489 X |
| 4,706,629 | 11/1987 | Wireland et al. | 123/494 X |
| 4,909,225 | 3/1990 | Gonze et al. | 123/494 |
| 4,913,099 | 4/1990 | Ota | 123/494 X |

FOREIGN PATENT DOCUMENTS

59-98540  8/1981  Japan .

*Primary Examiner*—Tony M. Argenbright
*Attorney, Agent, or Firm*—Lowe, Price, LeBlanc, Becker & Shur

[57] ABSTRACT

If an alcohol sensor which determines the amount of alcohol which is mixed with gasoline, malfunctions, the fuel supply correction factor which is designed to modify the basic fuel supply amount to compensate for the amount of alcohol, is prevented from being changed in accordance with the output of the alcohol sensor, and temporarily calibrated by feedback from the air-fuel ratio sensor disposed in the exhaust system.

6 Claims, 8 Drawing Sheets

INTERNAL COMBUSTION ENGINE AIR-FUEL RATIO CONTROL SYSTEM INCLUDING ALCOHOL SENSOR BACK-UP CONTROL ARRANGEMENT

BACKGROUND OF THE INVENTION

1. Field of the Invention

The present invention relates to an internal combustion engine and more specifically to an air-fuel control system for an internal combustion engine which is arranged to be operated on gasoline and/or mixtures of gasoline and alcohol (e.g. alcohol mixed with methanol and/or ethanol).

2. Description of the Prior Art

In the event that it is desired to operate an internal combustion engine on either gasoline or a mixture of gasoline and one or more alcohols, in order to control the amount of noxious emissions it is insufficient to only modify the ignition timing and it is essential to determine the amount of alcohol in the fuel. That is to say, as the amount of alcohol in the fuel can fluctuate markedly, without knowing the amount which is contained in the fuel being supplied, the amount of noxious emissions which are emitted from the engine cannot assuredly be attenuated to the desired level.

JP-A No. 56-98540 discloses an example of an arrangement which has been proposed in order to control the supply of fuel to the engine in accordance with the amount of alcohol contained therein. In this arrangement, a capacitance type alcohol sensor is disposed in the conduit through which fuel containing alcohol is supplied. The output of this sensor is indicative of the amount of alcohol which is contained in the fuel and is used to simultaneously correct both the amount of fuel which is supplied to the engine and the ignition timing.

However, this arrangement has suffered from the drawback that this system has been designed to correct the fuel supply amount in response to the output of the alcohol sensor and has not been arranged to cope with the situation wherein the alcohol sensor malfunctions.

Accordingly, in the case where the sensor does in fact malfunction, the control of the amount of fuel which is supplied to the engine deteriorates and induces a corresponding deterioration in the air-fuel ratio control which can lead to stoppage of the engine.

SUMMARY OF THE INVENTION

It is an object of the present invention to provide a system which can determine if an alcohol sensor is malfunctioning and in the case of such an event, suitably modify an alcohol correction factor in a manner which maintains the air-fuel ratio within stable limits and prevents the engine performance characteristics from deteriorating excessively.

In brief, the above object is achieved by an arrangement wherein, if the alcohol sensor malfunctions, the fuel supply correction factor which is designed to modify the basic fuel supply amount to compensate for the amount of alcohol, is prevented from being changed in accordance with the output of the alcohol sensor, and temporarily calibrated by feedback from the air-fuel ratio sensor disposed in the exhaust system. With this, the amount of fuel which is supplied to the engine is such as to enable sufficiently stable operation so that the tendency for the engine to stall is attenuated.

More specifically, a first aspect of the present invention is deemed to comprise an internal combustion engine which features: means for sensing the driving conditions of the engine; means for sensing the air-fuel ratio of the air-fuel mixture being supplied to the combustion chamber or chambers of the engine; means for sensing the amount of alcohol contained in the fuel being supplied to the engine; means for monitoring the output of the alcohol sensing means and determining if a malfunction has occurred in the alcohol sensing means; means responsive to the engine driving conditions for determining the basic fuel supply amount; means responsive to the amount of alcohol contained in the fuel for producing an alcohol correction factor via which the basic fuel supply amount is corrected; means responsive to the output of the air-fuel ratio detection means for producing an air-fuel ratio correction factor for feedback controlling the air-fuel ratio within a predetermined range; and control means responsive to the alcohol correction factor and the air-fuel ratio correction factor for determining the corrected basic fuel supply amount, the control means being arranged so that in response to the monitoring means detection of malfunction in the alcohol sensor, change in the alcohol correction factor in response to the output of the alcohol sensor is suspended, the alcohol correction factor is calibrated using the output of the air-fuel ratio sensing means, and at least the amended alcohol correction factor is used for controlling the setting of the basic fuel supply amount.

A second aspect of the present invention resides in an internal combustion engine of the nature described immediately above, but wherein the control means is such that it is responsive to the alcohol correction factor and the air-fuel ratio correction factor for determining the corrected basic fuel supply amount, and arranged to be responsive to the monitoring means to temporarily suspend any change in the alcohol correction factor in response to the alcohol sensor being detected as malfunctioning, determine if the air-fuel ratio is being clamped in one of the rich and lean directions by the output of the air-fuel ratio detecting means and temporarily modify the alcohol correction factor in response to the output of the air-fuel detection means in place of the air-fuel ratio correction factor.

In a further aspect of the present invention, the control means described above is further arranged so that when the engine is being re-started, in the event that the alcohol sensor has been previously detected as malfunctioning during previous engine operation, a previously memorized alcohol correction factor is used to correct the basic fuel amount.

Another aspect of the present invention is deemed to comprise a method of operating an internal combustion engine, which features the steps of: sensing the driving conditions of the engine; sensing the air-fuel ratio of the air-fuel mixture being supplied to a combustion chamber of the engine; sensing the amount of alcohol in the fuel being supplied to the engine using an alcohol sensor; monitoring the alcohol sensor to determine if it is malfunctioning; determining a basic fuel supply amount based on the sensed engine driving conditions; producing an alcohol correction factor based on the amount of alcohol which is sensed in the fuel; producing an air-fuel ratio correction factor based on the sensed air-fuel ratio; using the alcohol correction factor and the air-fuel ratio correction factor to correct the basic fuel supply amount; suspending change in the alcohol correction factor in response to the alcohol sensor in the event that the alcohol sensor is sensed as malfunctioning; and calibrating the alcohol correction factor using the sensed air-fuel ratio.

Yet another aspect of the invention is deemed to comprise an internal combustion engine which features: means for sensing the driving conditions of the engine; means for sensing the air-fuel ratio of the air-fuel mixture being supplied to a combustion chamber of the engine; an alcohol sensor for sensing the amount of alcohol in the fuel being supplied to the engine; means for monitoring the alcohol sensor to determine if it is malfunctioning; means for determining a basic fuel supply amount based on the sensed engine driving conditions; means for calculating an alcohol correction factor based on the amount of alcohol which is sensed in the fuel; means for calculating an air-fuel ratio correction factor based on the sensed air-fuel ratio; means for using the alcohol correction factor and the air-fuel ratio correction factor to correct the basic fuel supply amount; means for suspending change in the alcohol correction factor in response to the alcohol sensor in the event that the alcohol sensor is sensed as malfunctioning; and means for calibrating the alcohol correction factor using the sensed air-fuel ratio.

DETAILED DESCRIPTION OF THE EMBODIMENTS

Figure 1:
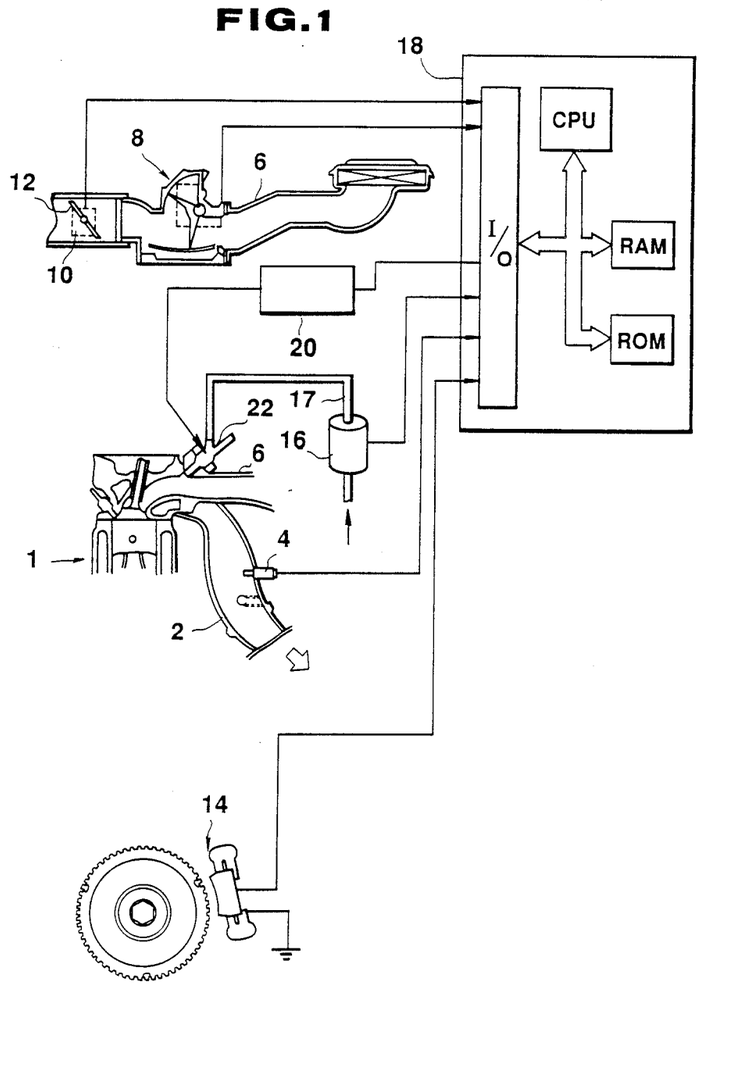
FIG. 1 shows an engine system to which the embodiments of the present invention are applied.

FIG. 1 schematically shows an engine system to which the embodiments of the present invention are applied. In this arrangement an engine generally denoted by the numeral 1 is arranged to be fed a fuel which consists of either gasoline or gasoline mixed with one or more different types of alcohol.

An exhaust manifold 2 associated with the engine has an oxygen sensor or the like type air-fuel ratio sensor 4 disposed therein.

An induction manifold 6 includes an air flow meter 8 via which the amount of air which is being inducted into the engine, can be sensed. A throttle position sensor 10 is operatively connected with a throttle valve 12 of the engine and arranged to sense the position of the same. An engine crank shaft sensor 14 is arranged to detect the angular speed of the engine crank shaft and output a pulse signal from which the engine speed can be derived.

An alcohol sensor 16 is disposed in a fuel supply conduit 17 and arranged to output a signal indicative of the amount of alcohol contained in the fuel which is being supplied to the combustion chamber or chambers of the engine. An example of this type or alcohol sensor is disclosed in JP-A No. 56-98540.

The outputs of the above mentioned sensors are respectively supplied to an I/O interface of a microprocessor which is included in a control unit 18.

As is conventional, the microprocessor includes a CPU, a dynamic RAM, a ROM (and/or a non-volatile RAM) which are operatively interconnected by a suitable bus or busses. A clock pulse generator (not shown) is operatively connected with the CPU and arranged to supply clock pulses of a predetermined frequency thereto.

In this arrangement, the air flow meter 8, crank angle sensor 14 and the throttle valve position sensor 10 comprises which shall be referred to as "driving condition" sensors or sensing means.

Programs and map data are stored in the ROM and-/or a non-volatile RAM (not shown), and are used to process the data which is supplied via the I/O interface. During operation of the microprocessor, map data and the like are read out into the RAM (e.g. dynamic ram) so as to facilitate ready access.

The I/O interface is connected with a fuel injection control system 20 in manner which enables an injection control signal Si to be supplied to the injector(s) 22. In response to this signal, the appropriate amount of fuel (gasoline containing one or more different alcohols) is injected into the induction manifold 6 immediately upstream of the induction port(s) of the engine.

Figure 2:
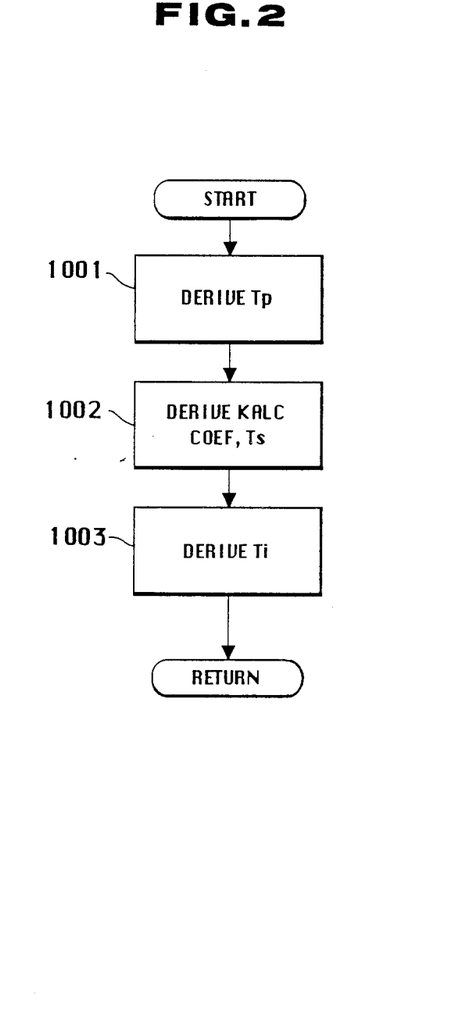
FIG. 2 is a flow chart showing a routine via which a fuel injection amount is determined.

FIG. 2 is a flow chart which shows the basic steps which are conducted in accordance with fuel injection amount calculation routine. This routine is arranged to be run a predetermined intervals.

The first step 1001 of this routine is such as to read the outputs of the air flow sensor and the crank angle sensor and determine the instant driving conditions (in this case indicated by the engine speed and load) and to derive a basic injection pulse width Tp in accordance with the following equation:

$$T_p = K \times \frac{Q_a}{N} \tag{1}$$

wherein K is a constant

In step 1002 various correction factors are derived. These factors are used to correct the Tp value in accordance with respect to various engine operating parameters and/or characteristics, and include: a correction COEFF indicative of the total effect of a plurality of coefficients which affect the time required for the fuel to reach the combustion chamber (viz., factors which relate to wetting of the induction port walls, the evaporation of the fuel, the influence of engine temperature, engine start-up, warm-up, idling etc.); the rise time of the fuel injector Ts, a feedback control factor $\alpha$ derived from the feedback from the oxygen sensor and an alcohol content dependent correction factor KALC.

The latter mentioned correction factor is essential in order to suitable set Tp in a manner to compensate for the changes in the stoichiometric air-fuel ratio, the fuel volatility characteristics, the heat of evaporation and/or the separation of the fuel into two phases in the event that sufficient water becomes mixed therewith.

The derivation of the KALC value is performed by table look-up using tabled data stored in the ROM. This data is recorded in terms of alcohol content and KALC.

Using the output of the alcohol sensor 16, it is possible read off the appropriate correction value.

At step 1003 the Tp value and the above mentioned correction factors are used in the following equation to derive an actual injection pulse width Ti.

$$Ti = Tp \times COEF \times α \times KALC + Ts \qquad (2)$$

The Ti data is used to form a fuel injection control signal Si which is supplied to the fuel injector 16.

In accordance with this, it is possible to control the engine fuel supply in a manner which ensures stable combustion.

Figure 3:
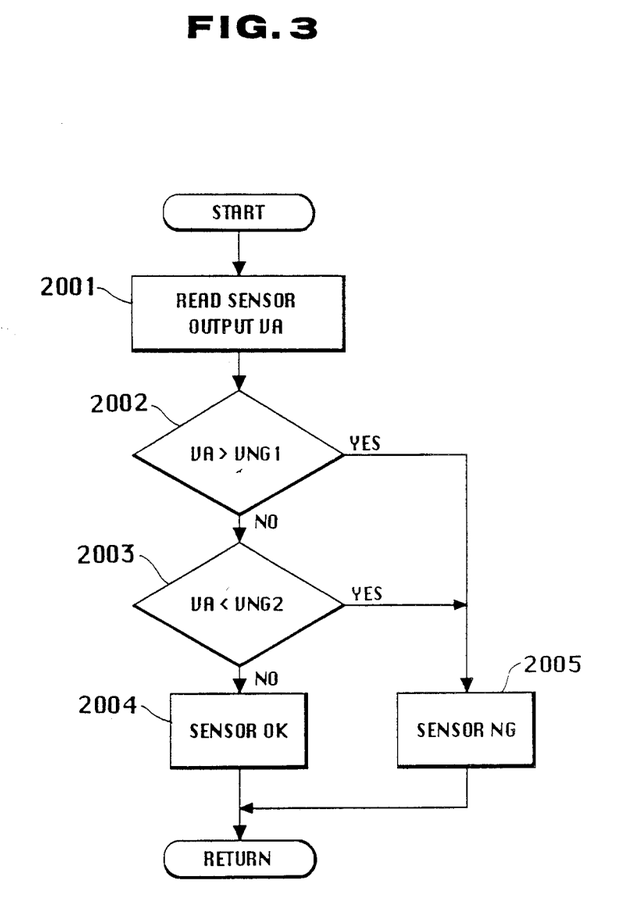
FIG. 3 is a flow chart showing the steps which characterize an alcohol sensor diagnostic routine.

FIG. 3 shows the steps which characterize a diagnostic routine which examines the operation of the alcohol sensor 16 and determines if it is operating properly or not.

At step 2001 of this routine the output of the alcohol sensor 16 is read and recorded as $V_A$. At steps 2002 and 2003 the $V_A$ value is ranged against predetermined $V_{NG1}$ and $V_{NG2}$. If the $V_A$ value is found to be greater than $V_{NG1}$ or less than $V_{NG2}$ the sensor is deemed to be malfunctioning and the routine flows to step 2005. On the other hand, if neither of the above conditions are met, the sensor is deemed to be operative and the routine flows to step 2005. In other words if $V_{NG2} \leq V_A \leq V_{NG1}$ then the sensor is indicated as being inoperative.

Figure 4:
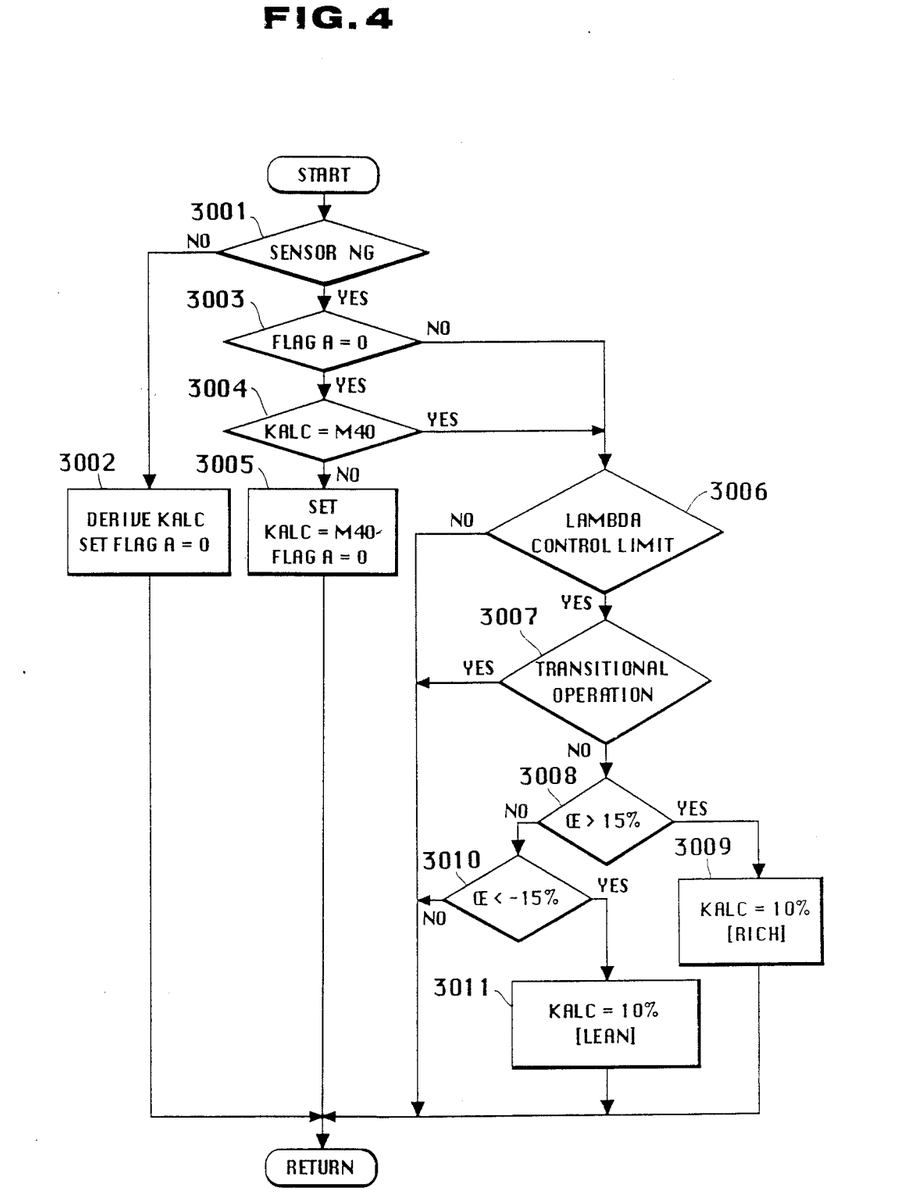
FIG. 4 is a flow chart which shows an air-fuel ratio control routine which is run in accordance with a first embodiment of the present invention.

FIG. 4 is a flow chart which depicts the steps which characterize an air-fuel ratio control routine. This routine is run at predetermined intervals and is such that the first step 3001 examines the outcome of the sensor diagnostic routine. In the event that the sensor is indicated as being operative, the routine flows to step 3002 wherein a Flag A used in connection with the KALC calculation, is set to zero.

On the other hand, if the outcome of the sensor examination routine is such as to indicate a malfunction (viz., NG), then the routine flows to step 3003 wherein the status of Flag A is checked. If the flag has been set to zero (note that Flag A is arranged to initially default to 0) then the routine flows to step 3004 wherein it is determined if the value of KALC has been suitably set to a value of M40 or not. If the outcome of this inquiry is negative, then at step 3005 KALC is set to M40 and flag A is set to 1.

If at either of steps 3003 and 3004, Flag A is found to be set to 1 or KALC=M40, then the routine flows to step 3006 wherein it is determined if the feedback from the oxygen sensor 4 indicates that the air-fuel ratio has drifted to either of the two permissible limits of the predetermined control zone or not.

For example, if the target air-fuel ratio is $\lambda = 1$ (viz., the stoichiometric air-fuel ratio) then a suitable narrow range on either side of this value is set as the upper and lower control limits. If it is determined that neither of these limits has been reached in step 3006, then the routine returns. On the other hand, if the air-fuel ratio control has deteriorated to the point where the $\lambda$ is now outside of a predetermined range and feedback control is rendered necessary, then the instant value of KALC is temporarily frozen and the routine goes to step 3007 wherein it is determined if the engine is undergoing transitory operation or not.

If the outcome of this enquiry performed in step 3007 is positive (viz., the engine is undergoing acceleration or deceleration) the routine returns. On the other hand, if the engine is operating under steady state conditions, then it is possible to amend the value of KALC using the data provided by the oxygen sensor and the routine flows to step 3008 wherein it is determined if the value of α (the air-fuel ratio correction factor) is above 15%. In the event that the 15% limit has been exceeded then it is deemed that the air-fuel ratio has deviated notably from the target value and at step 3009 the value of KALC is incremented by 10% in the rich direction (viz., M40 is adjusted in 10% increments toward a value of M25 for example). On the other hand, if α is less than 15% then the routine flows to step 3010 wherein it is determined if α is less than $-15\%$ (i.e. $α \leq 0.35$).

In the event of a positive outcome at step 3010, it is deemed that the air-fuel ratio has deviated excessively in the rich direction, and as a result the routine flows to step 3011 wherein KALC is incremented 10% in the lean direction (i.e. M40 is adjusted incrementally toward a value of M55). On the other hand while the α value remains within the 15% to $-15\%$ range, the routine returns without changing the KALC value which modifies the fuel supply amount.

In accordance with the above control, in the event that the alcohol sensor 8 malfunctions, the amount of fuel which is injected can be adjusted in a suitable manner so that at least the air-fuel ratio which is produced will result in stable engine operation and will obviate engine stalling. Viz., with each run of the routine once Flag A has been set to 1 in response to the indication that a sensor malfunction has occurred then depending on the $\lambda$ value obtained from the oxygen sensor output, then the value of KALC will be incremented in a direction which tends to bring the air-fuel ratio back toward the desired target value.

SECOND EMBODIMENT

Figure 5:
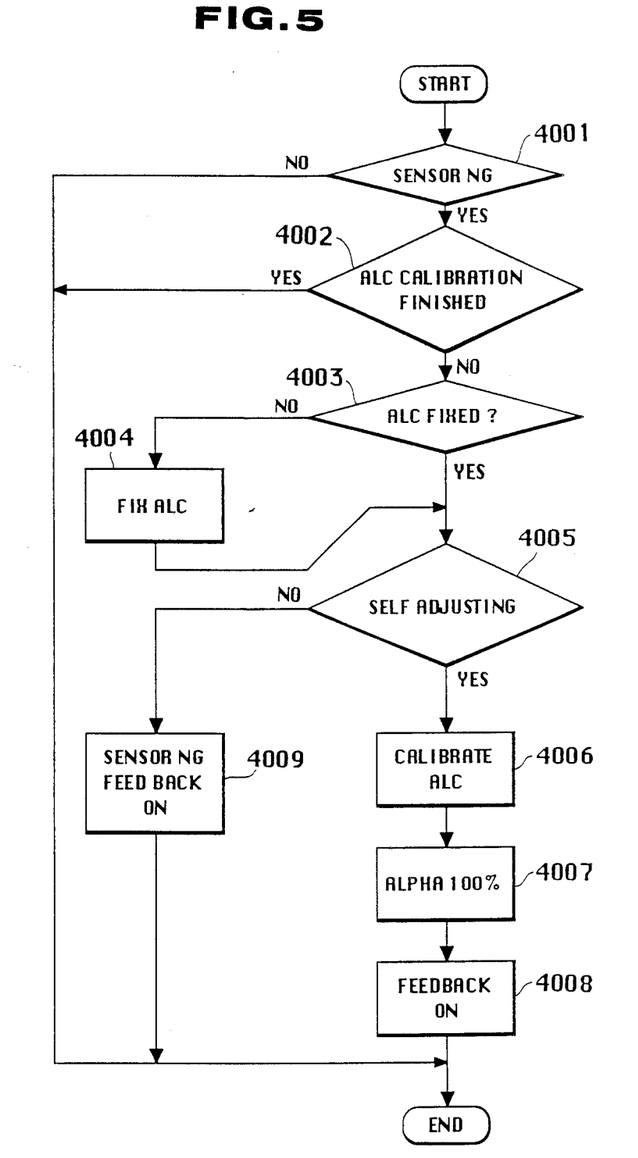
FIG. 5 shows an air-fuel ratio control routine which is run in accordance with a second embodiment of the present invention.

FIG. 5 shows the steps which characterize an air-fuel ratio control routine of a second embodiment of the present invention.

The first step (4001) of this routine is such as to examine the outcome of a sensor diagnostic routine of the nature shown in FIG. 3. If the sensor is indicated as being operative (OK) then the final injection value Ti is derived using the following equation:

$$Ti = Tp \times COEF \times ALC \times α \times KBLRC + Ts \qquad (3)$$

wherein Tp, COEF, α and Ts are the same as defined and/or derived in connection with equation (2) and wherein ALC is an alcohol correction factor and KBLRC is a self-adjustment correction factor.

As in the previous embodiment, the ALC value can be read out from tabled data recorded in terms of alcohol sensor output level.

However, if the alcohol sensor 16 is found to be have been indicated as being NG in step 4001, then the routine proceeds to step 4002 wherein it is determined if a calibration of the ALC value has been carried out or not. In the event that the calibration has not yet been executed, the routine proceeds to step 4003 wherein it is determined if the ALC value has been fixed or not, following the detection of the sensor malfunction.

If the outcome of the enquiry conducted in step 4003 is negative, then at step 4004 the value of ALC is frozen to prevent any radical drifting under the influence of erroneous input from the malfunctioning alcohol sensor, and the routine proceeds to step 4005.

At this stage of the routine, it is determined if the system has been switched to a self-adjusting mode or not. In the event that this mode, wherein data updating based on the output of the oxygen sensor 4 for the purposes of calibrating the ALC value, has been put into operation, the routine goes to step 4006 wherein an ALC calibration sub-routine is run. Further disclosure relating to this sub-routine will be given in later in connection with FIG. 7.

At step 4007 the air-fuel ratio feedback value Œ (ALPHA) is reset to 100% (viz., Œ =1) and at step 4008 normal λ feedback control is re-instated and the instant run is terminated.

However, if the outcome of step 4005 is such as to indicate that the self-adjusting mode has not yet been put into operation, the routine flows to step 4009 wherein a sensor malfunction feedback sub-routine is run.

Figure 6:
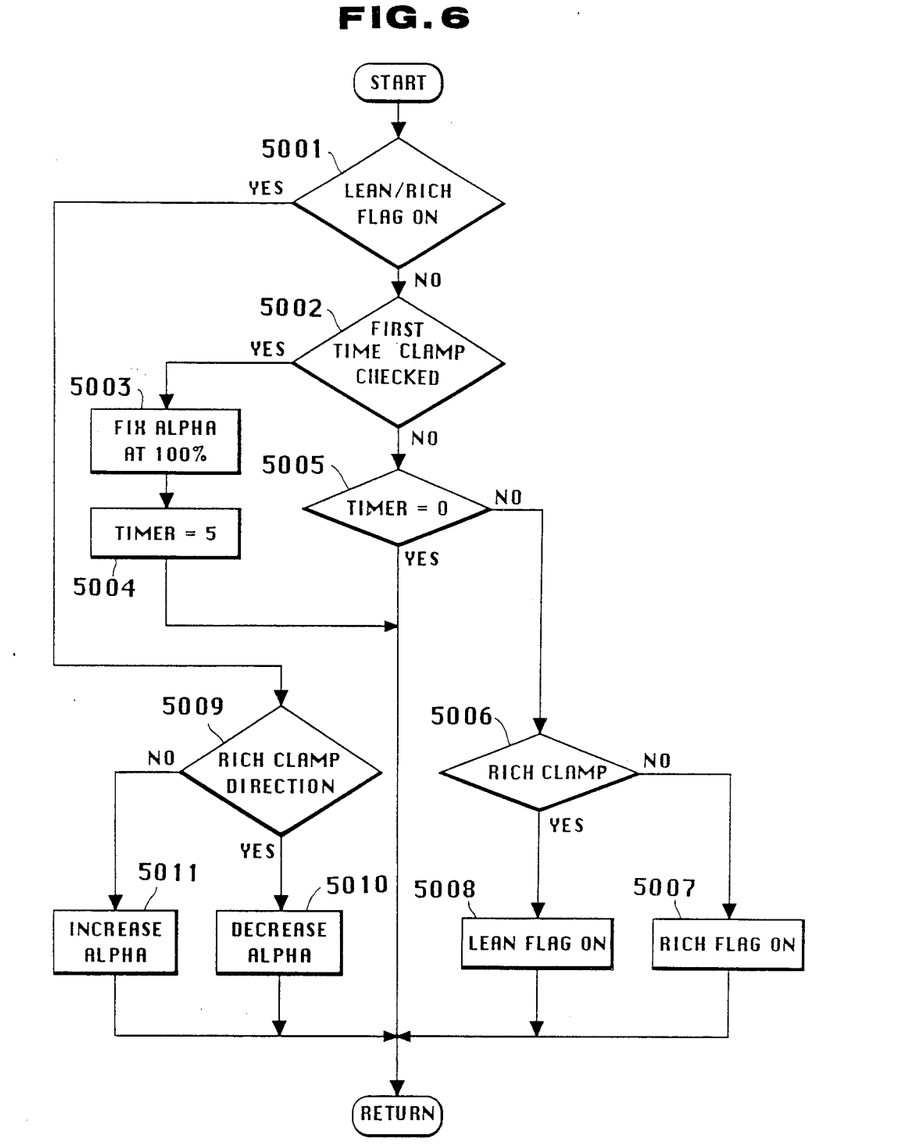
FIG. 6 shows a sensor NG feedback sub-routine which is run in the routine shown in FIG. 5.

FIG. 6 shows the steps which characterize the just mentioned sensor malfunction feedback sub-routine.

The first step of this routine is such as to examine the status of rich and lean flags. If neither of these flags have been set, the routine flows to step 5002 wherein it is determined if this first time a predetermined air-fuel ratio correction factor (Œ) clamp time has checked or not.

In the event that this is the first run of the instant routine following a NG detection and thus the first time the direction the air-fuel ratio clamp direction has been checked, then the routine flows to steps 5003 and 5004 wherein Œ is fixed at 100% (viz., Œ =1) and a soft clamp timer is set to count over a five second period.

However, if zero flag is not set, then the routine flows to step 5005 wherein the instant count of the clamp timer is checked. As mentioned above, if the count has reached zero, the zero flag is set and the routine returns. On the other hand, while the counter is running, the routine is guided toward step 5006 wherein it is determined in which direction in which the air-fuel ratio has been clamped by the output of the oxygen sensor 4.

In the event that the air-fuel ratio has not been clamped in the rich direction, the routine flows to step 5007 wherein a rich flag is set. On the other hand, if a rich clamping has been induced, then the routine flows to step 5008 wherein a lean flag is set.

At step 5001, if either of the rich or lean flags have been set the routine flows to step 5009 wherein it is determined if a rich air-fuel ratio clamp is taking place. In the event that the air-fuel mixture has been clamped in the rich direction, the routine goes to step 5010 wherein the value of Œ is decreased. On the other hand, if the air-fuel has been clamped in the lean direction, the routine goes to step 5011 wherein the value of Œ is increased.

Figure 7:
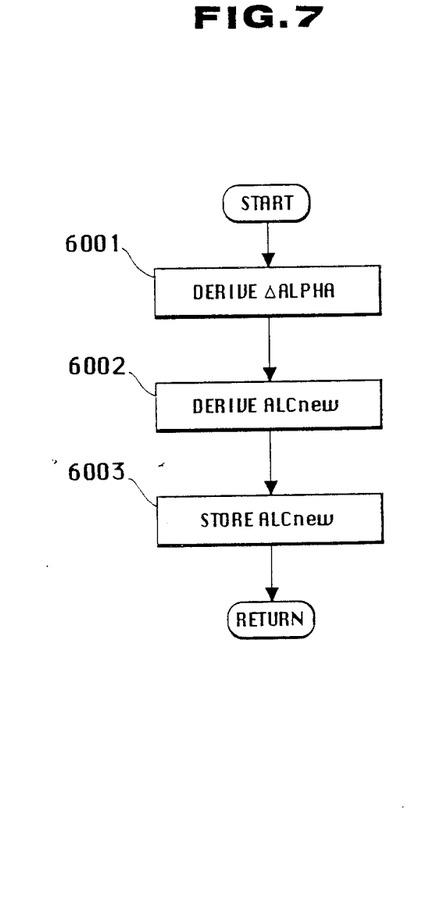
FIG. 7 is a flow chart which shows the steps which characterize a routine which calibrates the ALC correction factor.

FIG. 7 shows a sub-routine which is run each time the routine depicted in step 4006. In the first step of this sub-routine the change in Œ from the 100% setting at steps 5010 or 5011 is determined (viz., ΔŒ). At step 6002 the following equation is used to derive a ALC-new value.

$$ALCnew = ALCold +/- ALCold \times \frac{\Delta Œ}{100} \quad (4)$$

It is worth noting at this point that in the case of pure gasoline ALC=1 while in the case of the fuel consists of a mixture of 40-50% alcohol (M40-M50). In these latter two cases ALC varies between 1.3 and 1.45 respectively. In the case of M80 (80% alcohol) ALC=1.85.

Accordingly, if the output of the alcohol sensor indicated an M50 value just prior to being indicated as being diagnosed as being NG, and the output of the oxygen sensor 4 is such that the air-fuel ratio is not clamped in either the rich or lean directions, the value of ALC is fixed as it is, the clamping is released and the value of Œ is instantly reset to 100%.

In this instance the, magnitude of the increments of the change is made in the same is the lean and rich directions. However, it is within the scope of the present invention to arrange it so that the increments by which the value is varied in the lean direction is small and the one in the rich direction is large.

The reason for this is that, depending on the driving conditions, lean mixtures tend to induce engine hesitation, stumble and/or unstable idling. Accordingly, if the value of Œ is reset to 100% and Œ then forced to change from this value at steps 5010 and 5011 the possibility that the air-fuel mixture will eventually be controlled to a lean level where the engine is apt to stall due to the inherent tendency for the engine to exhibit hesitation, stumble and the like under such circumstances, is reduced.

As will be appreciated from steps 4006 to 4008 of the flow chart shown in FIG. 5, after the value of ALC has been calibrated via the routine shown in FIG. 7 (which utilizes the data obtained during the running of the sub-routine shown in FIG. 6), the value of Œ is reset to 100% and the sensor NG feedback control which was implemented in step 4009 is cancelled and normal feedback control of the Œ value by the oxygen sensor 4 reinstated.

In this embodiment it is possible to include the setting of the ISC (idle speed control) in the event that a NG diagnosis is made. Further, the value of ΔŒ is maintained within a range of 50-200% and in the event that the NG feedback control is just initiated in response to a NG diagnosis and/or the feedback control per se is NG, the alcohol correction factor is set at M50.

THIRD EMBODIMENT

Figure 8:
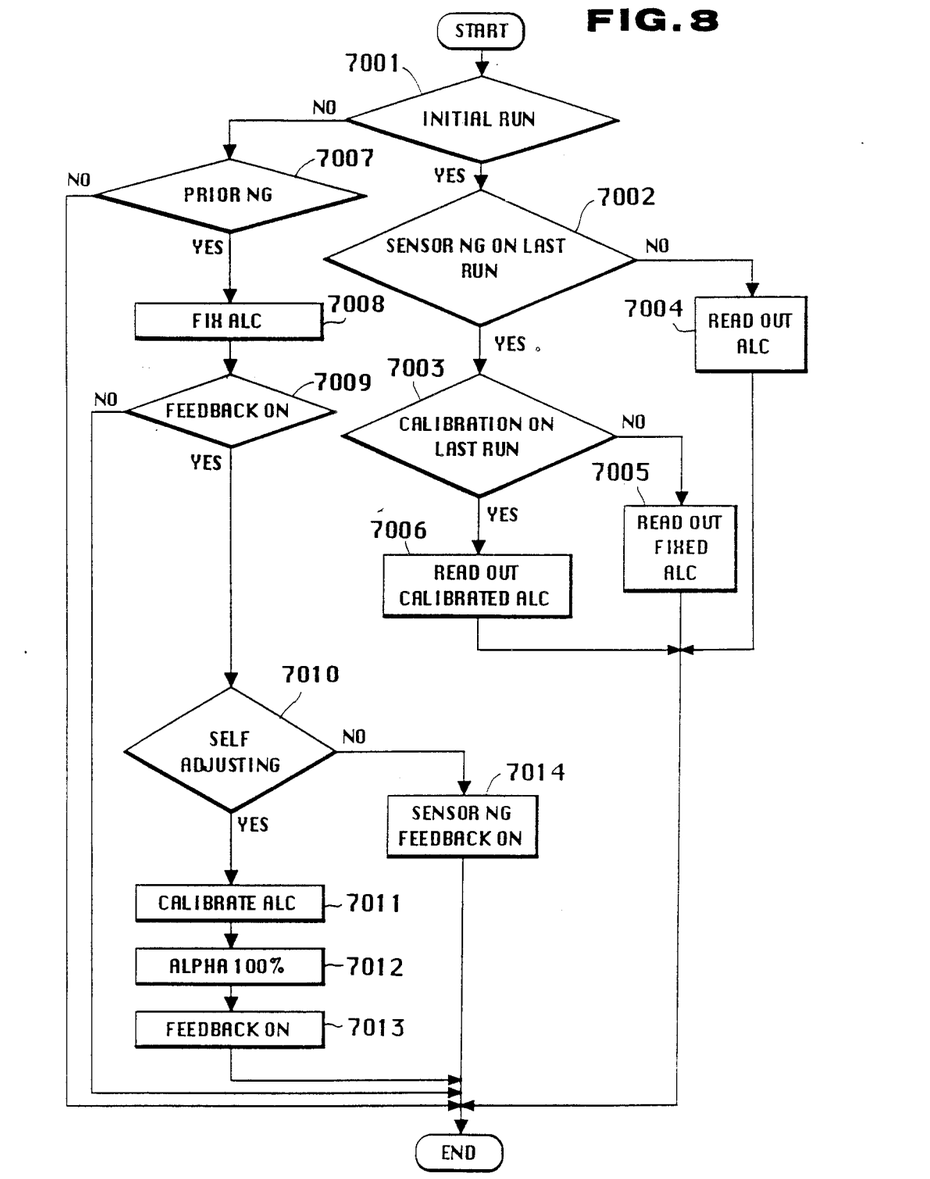
FIG. 8 shows a routine which is run during engine starts in accordance with a third embodiment of the present invention.

FIG. 8 shows a flow chart which depicts the steps which characterize a routine which is run in response to an engine restart.

In this third embodiment of the present invention, in response to the engine ignition key being closed and the engine being cranked, the first step of this routine is to determine if this is the first run since the ignition switch was closed, or not. In the event that it is the first run, then at step 7002 it is determined if the alcohol sensor was diagnosed as being NG during a previous engine operation. If no such diagnosis is found in memory then the routine flows to step 7004 wherein the value of ALC which was used on the last run is read out.

On the other hand, in the event that a sensor NG was recorded during the previous engine operation, the routine flows to step 7003 wherein it is determined if the value of ALC was calibrated or not during the last run of the instant routine. In the event that calibration of ALC was not completed on the previous run, the routine goes to step 7005 and reads out a fixed ALC value. However, in the event that a calibration of ALC was completed, then at step 7006 the calibrated value of ALC is read out of memory.

The reason for these steps is that while the engine is being cranked most of the fuel which is injected is still running along the walls of the induction system and will not be inducted into the combustion chambers in the manner which occurs during normal engine operation.

Thus, even though an output of the alcohol sensor is being received and may be in good working order, in order to minimize the risk of improper control which is apt to occur until such time as the output of the sensor is subject to a diagnosis routine, the above steps are conducted.

In the event that the instant run of the routine is not the first since the engine ignition switch was closed and the engine cranking has terminated, the routine flows to step 7007.

In the event that engine cranking has ceased and the engine has been started, the fuel which is being injected will be inducted into the combustion chambers. Accordingly, in order to ensure stable idling and/or running, it is determined in step 7007 if a sensor NG indication has previously been set in memory. In the event that no previous NG indication is found in memory, the program ends. However, if such an indication should be found then the routine flows to step 7008 wherein the value of ALC is fixed. Viz., in order to be on the safe side the value of ALC is fixed at the value which was used on the previous run of the instant routine.

At step 7009 it is determined if feedback control is being used or not. If feedback is not ON, then the routine returns. In the event that feedback control from the oxygen sensor has been implemented, then at step 7010 it is determined if the system has entered a self-adjusting mode. In the event that this mode has not yet been implemented, then the routine flows to step 7014 wherein the normal feedback control of the value is temporarily interrupted and a sensor NG feedback control is used in its place.

In the event that the outcome of step 7010 is positive, the routine flows through steps 7011, 7012 and 7013.

As the just mentioned three steps are essentially identical to steps 4006-4008 of the flow chart shown in FIG. 5, description of the same will be omitted for brevity.

What is claimed is:

1. In an internal combustion engine having a combustion chamber comprising;
   means for sensing the driving conditions of the engine;
   means for sensing the air-fuel ratio of the air-fuel mixture being supplied to the combustion chamber of said engine;
   means for sensing the amount of alcohol contained in the fuel being supplied to the engine;
   means for monitoring the output of said alcohol sensing means and determining if a malfunction has occurred in said alcohol sensing means;
   means responsive to the engine driving conditions for determining the basic fuel supply amount;
   means responsive to the amount of alcohol contained in the fuel for producing an alcohol correction factor via which the basic fuel supply amount is corrected;
   means responsive to the output of the air-fuel ratio detection means for producing an air-fuel ratio correction factor for feedback controlling the air-fuel ratio within a predetermined range;
   control means responsive to the alcohol correction factor and the air-fuel ratio correction factor for determining the corrected basic fuel supply amount, said control means being arranged so that in response to said monitoring means detecting a malfunction in said alcohol sensor, change in said alcohol correction factor in response to the output of said alcohol sensor is suspended, the alcohol correction factor is calibrated using the output of the air-fuel ratio sensing means, and at least the amended alcohol correction factor is used for controlling the setting of the basic fuel supply amount.

2. In an internal combustion engine having a combustion chamber;
   means for sensing the driving conditions of the engine;
   means for sensing the air-fuel ratio of the air-fuel mixture being supplied to the combustion chamber of said engine;
   means for sensing the amount of alcohol contained in the fuel being supplied to the engine;
   means for monitoring the output of said alcohol detecting means and determining if a malfunction has occurred therein;
   means responsive to the engine driving conditions for determining the basic fuel supply amount;
   means responsive to the amount of alcohol contained in the fuel for producing an alcohol correction factor via which the basic fuel supply amount is corrected;
   means responsive to the output of the air-fuel ratio detection means for producing an air-fuel ratio correction factor for feedback controlling the air-fuel ratio within a predetermined range; and
   control means responsive to the alcohol correction factor and the air-fuel ratio correction factor for determining the corrected basic fuel supply amount, said control means being arranged to be responsive to said monitoring means to temporarily suspend change in the alcohol correction factor in response to the alcohol sensor being detected as malfunctioning, determine if the air-fuel ratio is being clamped in one of the rich and lean directions by the output of said air-fuel ratio detecting means and temporarily modify said alcohol correction factor in response to the output of said air-fuel detection means in place of the air-fuel ratio correction factor.

3. An internal combustion engine as claimed in claim 1 wherein said control means is further arranged so that when the engine is being re started, in the event that the alcohol sensor has been previously detected as malfunctioning during previous engine operation, a previously memorized alcohol correction factor is used to correct the basic fuel amount.

4. An internal combustion engine as claimed in claim 2 wherein said control means is further arranged so that when the engine is being re-started, in the event that the alcohol sensor has been previously detected as malfunctioning during previous engine operation, a previously memorized alcohol correction factor is used to correct the basic fuel amount.

5. In a method of operating an internal combustion engine, the steps comprising:
   sensing the driving conditions of the engine;
   sensing the air-fuel ratio of the air-fuel mixture being supplied to a combustion chamber of the engine;
   sensing the amount of alcohol in the fuel being supplied to the engine using an alcohol sensor;
   monitoring said alcohol sensor to determine if it is malfunctioning;
   determining a basic fuel supply amount based on the sensed engine driving conditions;
   producing an alcohol correction factor based on the amount of alcohol which is sensed in the fuel;

producing an air-fuel ratio correction factor based on the sensed air-fuel ratio;

using said alcohol correction factor and said air-fuel ratio correction factor to correct the basic fuel supply amount;

suspending change in said alcohol correction factor in response to said alcohol sensor in the event that said alcohol sensor is sensed as malfunctioning; and calibrating said alcohol correction factor using the sensed air-fuel ratio.

6. In an internal combustion engine;

means for sensing the driving conditions of the engine;

means for sensing the air-fuel ratio of the air-fuel mixture being supplied to a combustion chamber of the engine;

an alcohol sensor for sensing the amount of alcohol in the fuel being supplied to the engine;

means for monitoring said alcohol sensor to determine if it is malfunctioning;

means for determining a basic fuel supply amount based on the sensed engine driving conditions;

means for calculating an alcohol correction factor based on the amount of alcohol which is sensed in the fuel;

means for calculating an air-fuel ratio correction factor based on the sensed air-fuel ratio;

means for using said alcohol correction factor and said air-fuel ratio correction factor to correct the basic fuel supply amount;

means for suspending change in said alcohol correction factor in response to said alcohol sensor in the event that said alcohol sensor is sensed as malfunctioning; and means for calibrating said alcohol correction factor using the sensed air-fuel ratio.

* * * * *